United States Patent
Huang et al.

(10) Patent No.: US 10,215,838 B2
(45) Date of Patent: Feb. 26, 2019

(54) METHOD AND APPARATUS FOR LOCATING WIRELESS ACCESS POINT

(71) Applicant: Huawei Technologies Co., Ltd., Shenzhen (CN)

(72) Inventors: Shukai Huang, Suzhou (CN); Jianguo Gu, Suzhou (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 51 days.

(21) Appl. No.: 15/664,148

(22) Filed: Jul. 31, 2017

(65) Prior Publication Data

US 2017/0328981 A1    Nov. 16, 2017

Related U.S. Application Data

(63) Continuation of application No. PCT/CN2016/071203, filed on Jan. 18, 2016.

(30) Foreign Application Priority Data

Jan. 31, 2015    (CN) .......................... 2015 1 0055514

(51) Int. Cl.
| | |
|---|---|
| *H04W 24/00* | (2009.01) |
| *G01S 5/14* | (2006.01) |
| *G01S 5/02* | (2010.01) |
| *H04W 64/00* | (2009.01) |
| *H04L 29/12* | (2006.01) |
| *H04W 84/12* | (2009.01) |
| *H04W 88/08* | (2009.01) |

(52) U.S. Cl.
CPC ........................ *G01S 5/14* (2013.01); *G01S 5/02* (2013.01); *H04W 64/00* (2013.01); *H04L 61/6022* (2013.01); *H04W 84/12* (2013.01); *H04W 88/08* (2013.01)

(58) Field of Classification Search
None
See application file for complete search history.

(56) References Cited

FOREIGN PATENT DOCUMENTS

| | | |
|---|---|---|
| CN | 102209381 A | 10/2011 |
| CN | 102595592 A | 7/2012 |
| CN | 103476109 A | 12/2013 |
| EP | 2392939 A1 | 12/2011 |
| WO | 2010045466 A2 | 4/2010 |
| WO | 2014146255 A1 | 9/2014 |

*Primary Examiner* — Suhail Khan
(74) *Attorney, Agent, or Firm* — Slater Matsil, LLP

(57) ABSTRACT

Embodiments disclose a method and an apparatus for locating a wireless access point. M APs are deployed in a physical area, the M APs include N first reference APs and L to-be-located APs, and physical locations of the first reference APs and a first distance between any two first reference APs are determinate. The method includes obtaining a first electromagnetic wave signal received by a first to-be-located AP of the L to-be-located Aps, where the first electromagnetic wave signal includes an electromagnetic wave signal sent by each first reference AP. The method also includes determining a second distance between the first to-be-located AP and each first reference AP according to the first electromagnetic wave signal, and determining a physical location of the first to-be-located AP according to the first distance, the second distance, and the physical locations of all the N first reference APs.

15 Claims, 2 Drawing Sheets

METHOD AND APPARATUS FOR LOCATING WIRELESS ACCESS POINT

CROSS-REFERENCE TO RELATED APPLICATIONS

This application is a continuation of International Patent Application No. PCT/CN2016/071203 filed on Jan. 18, 2016, which claims priority to Chinese Patent Application No. 201510055514.1 filed on Jan. 31, 2015. The disclosures of the aforementioned applications are hereby incorporated by reference in their entireties.

TECHNICAL FIELD

The present invention relates to the field of data processing, and in particular, to a method and an apparatus for locating a wireless access point.

BACKGROUND

As a wireless technology, WLAN is applied by increasing commercial users. Deployment of an internal network by using the wireless technology can reduce problems encountered during a large quantity of wired deployment, and is a quick and easy-to-use networking technology.

Generally, hundreds or thousands of wireless access points (WLAN AP) need to be deployed during network deployment of a current enterprise or an industrial park. To conveniently manage APs in a network management system, after a network node is deployed in a specific physical location, AP icons (network elements) corresponding to the APs need to be correspondingly marked on a building drawing of an actual environment according to deployment locations of the APs in the actual environment, so as to facilitate operations at the later stage such as configuring and upgrading an actual physical device by using the building drawing in the network management system.

During network deployment of a current enterprise, a network administrator generally imports a building drawing of an office building into a network management system first, and then adds each AP to the building drawing. A specific adding manner is as follows: The network administrator needs to manually place an AP corresponding to a MAC address identified on a device to a corresponding location in the building drawing. The corresponding location is a corresponding location of an actual mounting point of the device in the drawing.

The AP is not placed at a constant location and sometimes may be placed on a ceiling or in another concealed location. If it is not convenient for the network administrator to view the MAC address of the device after a physical device is mounted in position, there is great implementation difficulty and inconvenient operations are caused when the network administrator manually places the AP corresponding to the MAC address identified on the device to the corresponding location in the building drawing. In addition, because there are generally hundreds or thousands of APs in a network, manual operations lead to huge workload and are error-prone.

SUMMARY

Embodiments of the present invention provides a method and an apparatus for locating a wireless access point. The method and the apparatus provided in the embodiments of present invention resolve prior-art problems that locating a wireless access point by manual operations leads to huge workload, is error-prone, and so on.

According to a first aspect, a method for locating a wireless access point is provided, where M APs are deployed in a physical area, the M APs include N first reference APs and L to-be-located APs, physical locations of the first reference APs and a first distance between any two first reference APs are determinate, N is an integer that is greater than or equal to 3 and less than M, a sum of N and L equals to M, and L is an integer. The method includes obtaining a first electromagnetic wave signal received by a first to-be-located AP of the L to-be-located APs, where the first electromagnetic wave signal includes an electromagnetic wave signal sent by each first reference AP. The method also includes determining a second distance between the first to-be-located AP and each first reference AP according to the obtained first electromagnetic wave signal. The method also includes determining a physical location of the first to-be-located AP according to the first distance, the second distance, and the physical locations of all the first reference APs.

With reference to the first aspect, in a first possible implementation, the L to-be-located APs are disposed on different floors of a building, and a first vertical distance between each of the N first reference APs and ground of a specified floor is less than a first threshold, where the determining a physical location of the first to-be-located AP includes: determining a second vertical distance between the first to-be-located AP and the ground of the specified floor according to the first distance and the second distance; and determining whether the second vertical distance is not greater than the first threshold; and if yes, determining the physical location of the first to-be-located AP by using the ground of the specified floor as a reference.

With reference to the first possible implementation of the first aspect, in a second possible implementation, when the second vertical distance is greater than the first threshold, the determining a physical location of the first to-be-located AP includes: determining, according to the second vertical distance, a target floor on which the first to-be-located AP is located, and determining the physical location of the first to-be-located AP by using ground of the target floor as a reference.

With reference to the second possible implementation of the first aspect, in a third possible implementation, after it is determined that at least three to-be-located APs are physically located on the target floor, the method further includes: determining a third distance between any two to-be-located APs of the at least three to-be-located APs according to physical locations of the at least three to-be-located APs, and using the at least three to-be-located APs as second reference APs of the target floor; obtaining a second electromagnetic wave signal received by a second to-be-located AP, whose physical location has not been determined, of the L to-be-located APs, where the second electromagnetic wave signal includes an electromagnetic wave signal sent by each second reference AP; determining a fourth distance between the second to-be-located AP and each second reference AP according to the second electromagnetic wave signal; and determining the physical location of the second to-be-located AP by using a physical location of the second reference AP, the third distance, and the fourth distance.

With reference to any one of the first aspect and the first to the third possible implementations of the first aspect, in a fourth possible implementation, after the determining a physical location of the first to-be-located AP, the method further includes: obtaining building drawing information of the physical area; and adding information about determined physical locations of the M APs to the building drawing information, so that any physical location in a building is provided with the to-be-located AP, and an identifier of the to-be-located AP is set at a location, corresponding to the any physical location, in the building drawing.

According to a second aspect, an apparatus for locating a wireless access point is provided, where M APs are deployed in a physical area, the M APs include N first reference APs and L to-be-located APs, physical locations of the first reference APs and a first distance between any two first reference APs are determinate, N is an integer that is greater than or equal to 3 and less than M, a sum of N and L equals to M, and L is an integer. The apparatus includes: an obtaining module, configured to obtain a first electromagnetic wave signal received by a first to-be-located AP of the L to-be-located APs, where the first electromagnetic wave signal includes an electromagnetic wave signal sent by each first reference AP. The apparatus also includes a distance calculation module, configured to determine a second distance between the first to-be-located AP and each first reference AP according to the obtained first electromagnetic wave signal. The apparatus also includes a locating module, configured to determine a physical location of the first to-be-located AP according to the first distance, the second distance, and the physical locations of all the first reference APs.

With reference to the second aspect, in a first possible implementation, the L to-be-located APs are disposed on different floors of a building, a first vertical distance between each of the N first reference APs and ground of a specified floor is less than a first threshold, and the locating module is further configured to: determine a second vertical distance between the first to-be-located AP and the ground of the specified floor according to the first distance and the second distance; and determine whether the second vertical is not greater than the first threshold, and if yes, determine the physical location of the first to-be-located AP by using the ground of the specified floor as a reference.

With reference to the first possible implementation of the second aspect, in a second possible implementation, when the second vertical distance is greater than the first threshold, the locating module is further configured to: determine, according to the second vertical distance, a target floor on which the first to-be-located AP is located, and determine the physical location of the first to-be-located AP by using ground of the target floor as a reference.

With reference to the second possible implementation of the second aspect, in a third possible implementation, after it is determined that at least three to-be-located APs are physically located on the target floor, the locating module is further configured to: determine a third distance between any two to-be-located APs of the at least three to-be-located APs according to physical locations of the at least three to-be-located APs, and use the at least three to-be-located APs as second reference APs of the target floor; obtain a second electromagnetic wave signal received by a second to-be-located AP, whose physical location has not been determined, of the L to-be-located APs, where the second electromagnetic wave signal includes an electromagnetic wave signal sent by each second reference AP; determine a fourth distance between the second to-be-located AP and each second reference AP according to the second electromagnetic wave signal; and determine the physical location of the second to-be-located AP by using a physical location of the second reference AP, the third distance, and the fourth distance.

With reference to any one of the second aspect and the first to the third possible implementations of the second aspect, in a fourth possible implementation, the apparatus further includes: an information adding module, configured to: obtain building drawing information of the physical area; add information about determined physical locations of the M APs to the building drawing information, so that any physical location in a building is provided with the to-be-located AP, and an identifier of the to-be-located AP is set at a location, corresponding to the any physical location, in the building drawing.

One or two of the foregoing technical solutions have at least the following technical effects.

According to the method and the apparatus provided in the present invention, a to-be-located AP whose location is unknown is located by using an electromagnetic wave signal transmitted by a reference AP whose location has been determined, a location relationship between each to-be-located AP and the reference AP is determined by a device according to the location of the reference AP and strength of an electromagnetic wave signal, and a system automatically performs calculation to determine a physical location of each to-be-located AP in a network management topology, so as to facilitate AP management for a network administrator.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

To make the objectives, technical solutions, and advantages of the embodiments of the present invention clearer, the following describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The following further describes the embodiments of the present invention in detail with reference to the accompanying drawings in this specification.

Figure 1:
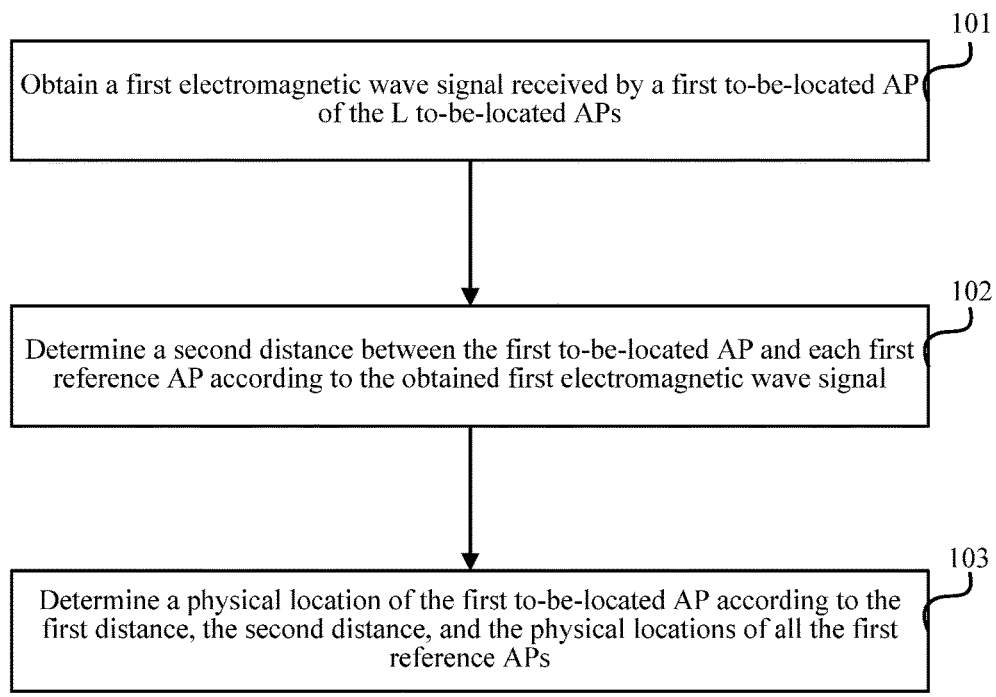
FIG. 1 is a schematic flowchart of a method for locating a wireless access point according to an embodiment of the present invention.

As shown in FIG. 1, an embodiment of the present invention provides a method for locating a wireless access point. M APs are deployed in a physical area, the M APs include N first reference APs and L to-be-located APs, physical locations of the first reference APs and a first distance between any two first reference APs are determinate, N is an integer that is greater than or equal to 3 and less than M, a sum of N and L equals to M, and L is an integer. The method includes the following steps.

In this embodiment of the present invention, to improve accuracy of a physical location of a located AP, when the physical locations of the first reference APs are being determined, that most APs can be within a range of a triangle (the first reference APs are vertexes of the triangle) formed by three first reference APs is ensured as much as possible. In addition, the physical locations of the first reference APs may be determined by entering location information by a user or by using some locating technologies.

Step 101: Obtain a first electromagnetic wave signal received by a first to-be-located AP of the L to-be-located APs, where the first electromagnetic wave signal includes an electromagnetic wave signal sent by each first reference AP.

In this embodiment of the present invention, each to-be-located AP can receive an electromagnetic wave signal sent by another AP within a specified distance range. Because only a location of a reference AP is determinate, an electromagnetic wave signal sent by the reference AP is screened out from received electromagnetic wave signals, so that a location relationship between the reference AP and a first to-be-located AP may be determined according to strength of the electromagnetic wave signal sent by the reference AP.

Step 102: Determine a second distance between the first to-be-located AP and each first reference AP according to the obtained first electromagnetic wave signal.

According to a wireless signal propagation model, a spatial distance between a signal transmitting device (for example, the reference AP) and a signal receiving device (for example, the to-be-located AP) may be calculated according to strength of an electromagnetic wave signal in combination with propagation attenuation.

Because the first to-be-located AP may determine a distance between the to-be-located AP and the reference AP by using the electromagnetic wave signal sent by the reference AP, a physical location of the to-be-located AP may be determined according to the distance relationship between the reference AP and the to-be-located AP.

Figure 2:
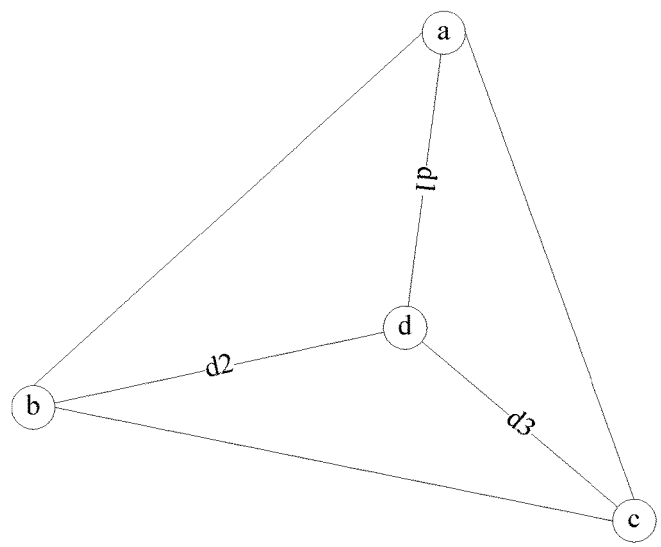
FIG. 2 is a schematic diagram of a location relationship between a reference AP and a to-be-located AP according to an embodiment of the present invention.

As shown in FIG. 2, three reference APs are located in locations a, b, and c on a plane, respectively, and after a to-be-located AP on the plane receives electromagnetic wave signals sent by nearby APs, electromagnetic wave signals sent by the reference APs are screened out from the received electromagnetic wave signals. A distance between a first to-be-located AP and each reference AP may be determined based on an electromagnetic wave signal sent by the reference AP and a predicted signal attenuation coefficient. For example, the first to-be-located AP is in a location d on the plane, spatial distances between the first to-be-located AP and all the reference APs may be calculated according to the electromagnetic wave signals and a signal attenuation coefficient are d1, d2, and d3, respectively.

Step 103: Determine a physical location of the first to-be-located AP according to the first distance, the second distance, and the physical locations of all the first reference APs.

The first distance and the second distance may form a spatial triangle with the reference AP and the first to-be-located AP as vertexes. Because the physical location of the reference AP is determinate (that is, coordinates of the reference AP in a spatial coordinate system are determinate), coordinates of the first to-be-located AP may be further calculated by using a trigonometric formula.

To more accurately determine a physical location of each to-be-located AP, after a physical location of each AP within a specified range is determined by using the first reference AP, the physical location of each to-be-located AP is further modified. Specific implementation may be as follows.

Multiple triangles are formed by using any three APs as vertexes, and a location of a central point of each triangle is obtained by means of calculation.

A location of each AP is compared with the location of the central point obtained by means of calculation, and if a distance between an AP (an AP-1 for short) and the central point is less than a specified value, a physical location of the AP-1 is re-determined by using a vertex AP of a triangle corresponding to the central point.

After multiple APs (for example, there are four APs and each AP may be referred to as an AP-1, an AP-2, an AP-3, and an AP-4 for short) within a range are located by using the first reference AP, one triangle may be formed by using any three of the multiple APs. Formed triangles include a triangle a with the AP-1, the AP-2, and the AP-3 as vertexes, a triangle b with the AP-2, the AP-3, and the AP-4 as vertexes, and a triangle c with the AP-1, the AP-3, and the AP-4 as vertexes, and each triangle is corresponding to a central point. If a location of a to-be-located AP is close to a central point of a triangle (for example, the triangle c), the to-be-located AP may be relocated by using the vertexes AP-1, AP-3, and AP-4 of the triangle c. Because the to-be-located AP is close to the central point of the triangle c, the physical location re-determined by using the triangle c is more accurate.

In addition, to facilitate viewing a physical location of each AP by a user, according to the method provided in this embodiment of the present invention, an identifier of the AP may be further marked in a corresponding location of a building drawing, and after the determining a physical location of the first to-be-located AP, the method further includes: obtaining building drawing information of the physical area; and adding information about determined physical locations of the M APs to the building drawing information, so that any physical location in a building is provided with the to-be-located AP, and an identifier of the to-be-located AP is set at a location, corresponding to the any physical location, in the building drawing.

In a specific application environment, the to-be-located APs may be disposed on different floors of a building, and due to blocking of floor slabs, electromagnetic wave signals received by the to-be-located APs on different floors are different.

For example, to-be-located APs (d and e) and a reference AP are disposed on a same floor, a to-be-located AP (f) is disposed on another floor, and due to a blocking effect of floor slabs, strength of an electromagnetic wave signal sent by the reference AP and received by the to-be-located AP f is less than a preset value. Because strength of electromagnetic wave signals received by APs disposed on different floors may be different, in this embodiment of the present invention, whether each to-be-located AP and a reference AP are located on a same floor may be determined according to strength of electromagnetic wave signals. Specific implementation may be as follows:

Manner 1: A to-be-located AP receives electromagnetic wave signals sent by APs within a specified range. Then, whether there is an electromagnetic wave signal sent by a reference AP in the electromagnetic wave signals received by each to-be-located AP is determined. If yes, whether electromagnetic wave signals sent by all reference APs are less than a reference value of specified electromagnetic wave strength is determined. If electromagnetic wave signals sent by all reference APs are less than the reference value, it is determined that the to-be-located AP and the reference AP are located on different floors; and if strength of an electromagnetic wave signal corresponding to any one reference AP is greater than the reference value, the to-be-located AP and the reference AP are located on a same floor.

Because distances between to-be-located APs and the reference AP are different, corresponding detected electromagnetic wave signals are also different. However, strength of an electromagnetic wave signal corresponding to at least one reference AP among electromagnetic wave signals corresponding to three reference APs is greater than the reference value of the electromagnetic wave strength. If a to-be-located AP and the reference AP are located on different floors, due to blocking of floors and floor stabs between the floors, attenuation of electromagnetic wave signals is far greater than that of APs on a same floor. Therefore, strength of electromagnetic wave signals that are corresponding to all reference APs and that are detected by the to-be-located AP is less than the reference value.

Manner 2: Because strength of electromagnetic wave signals detected by APs on different floors is different, and the strength of different signals is corresponding to different distances, after distances between the APs are calculated according to signal strength, floors on which the to-be-located APs are located may be determined correspondingly. Specific implementation of determining a physical location of the first to-be-located AP may be as follows:

A: Determine a second vertical distance between the first to-be-located AP and ground of a specified floor according to the first distance and the second distance.

To facilitate calculating a physical location of a to-be-located AP, each of the N first reference APs is generally disposed on a same floor (that is, a first vertical distance between each of the N first reference APs and the ground of the specified floor is less than a first threshold).

B: Determine whether the second vertical distance is not greater than the first threshold, and if yes, determine the physical location of the first to-be-located AP by using the ground of the specified floor as a reference.

C: When the second vertical distance is greater than the first threshold, determine, according to the second vertical distance, a target floor on which the first to-be-located AP is located, and determine the physical location of the first to-be-located AP by using the ground of the target floor as a reference.

Because an electromagnetic wave signal received through an adjacent floor is relatively weak, to more accurately locate an AP on the adjacent floor, after three APs on the adjacent floor are located, another AP may be located by using the located three APs on the adjacent floor as reference APs, and after it is determined that at least three to-be-located APs are physically located on the target floor, the method further includes: determining a third distance between any two to-be-located APs of the at least three to-be-located APs according to physical locations of the at least three to-be-located APs, and using the at least three to-be-located APs as second reference APs of the target floor; obtaining a second electromagnetic wave signal received by a second to-be-located AP, whose physical location has not been determined, of the L to-be-located APs, where the second electromagnetic wave signal includes an electromagnetic wave signal sent by each second reference AP; determining a fourth distance between the second to-be-located AP and each second reference AP according to the second electromagnetic wave signal; and determining the physical location of the second to-be-located AP by using a physical location of the second reference AP, the third distance, and the fourth distance.

Figure 3:
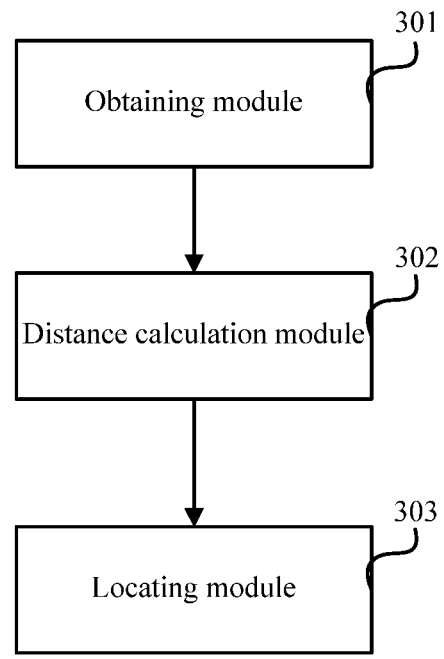
FIG. 3 is a schematic structural diagram of an apparatus for locating a wireless access point according to an embodiment of the present invention.

As shown in FIG. 3, an embodiment of the present invention further provides an apparatus for locating a wireless node AP. M APs are deployed in a physical area, the M APs include N first reference APs and L to-be-located APs, physical locations of the first reference APs and a first distance between any two first reference APs are determinate, N is an integer that is greater than or equal to 3 and less than M, a sum of N and L equals to M, and L is an integer. The apparatus includes an obtaining module 301, configured to obtain a first electromagnetic wave signal received by a first to-be-located AP of the L to-be-located APs, where the first electromagnetic wave signal includes an electromagnetic wave signal sent by each first reference AP. The apparatus also includes a distance calculation module 302, configured to determine a second distance between the first to-be-located AP and each first reference AP according to the obtained first electromagnetic wave signal. The apparatus also includes a locating module 303, configured to determine a physical location of the first to-be-located AP according to the first distance, the second distance, and the physical locations of all the first reference APs.

In a specific application environment, the to-be-located APs may be disposed on different floors of a building, and due to blocking of floor slabs, electromagnetic wave signals received by the to-be-located APs on different floors are different.

Because strength of electromagnetic wave signals detected by APs on different floors is different, and the strength of different signals is corresponding to different distances, after distances between the APs are calculated according to signal strength, floors on which the to-be-located APs are located may be determined correspondingly. When the L to-be-located APs are disposed on different floors of a building, a first vertical distance between each of the N first reference APs and ground of a specified floor is less than a first threshold (that is, the N first reference APs are on a same floor), specific implementation of determining a physical location of the first to-be-located AP by the locating module 303 may be: determining a second vertical distance between the first to-be-located AP and the ground of the specified floor according to the first distance and the second distance; and determining whether the second vertical is not greater than the first threshold, and if yes, determining the physical location of the first to-be-located AP by using the ground of the specified floor as a reference.

Further, to determine specific locations of APs on different floors of a building after a reference AP is selected once, after an AP on a floor is located, an AP on an adjacent floor is further located according to the located AP. That is, when the second vertical distance is greater than the first threshold, the specific implementation of determining a physical location of the first to-be-located AP by the locating module 303 further includes: determining, according to the second vertical distance, a target floor on which the first to-be-located AP is located, and determining the physical location of the first to-be-located AP by using ground of the target floor as a reference.

Because an electromagnetic wave signal received through an adjacent floor is relatively weak, to more accurately locate an AP on the adjacent floor, after three APs on the adjacent floor are located, another AP may be located by using the located three APs on the adjacent floor as reference APs, and after it is determined that at least three to-be-located APs are physically located on the target floor.

The locating module 303 is further configured to determine a third distance between any two to-be-located APs of the at least three to-be-located APs according to physical locations of the at least three to-be-located APs, and use the at least three to-be-located APs as second reference APs of the target floor; obtain a second electromagnetic wave signal received by a second to-be-located AP, whose physical location has not been determined, of the L to-be-located APs, where the second electromagnetic wave signal includes an electromagnetic wave signal sent by each second reference AP; determine a fourth distance between the second to-be-located AP and each second reference AP according to the second electromagnetic wave signal; and determine the physical location of the second to-be-located AP by using a physical location of the second reference AP, the third distance, and the fourth distance.

In addition, to be more convenient for a user to view a physical location of each AP, according to the apparatus provided in this embodiment of the present invention, an identifier of the AP may be further marked in a corresponding location of a building drawing, and after the determining a physical location of the first to-be-located AP, the apparatus further includes: an information adding module, configured to: obtain building drawing information of the physical area; add information about determined physical locations of the M APs to the building drawing information, so that any physical location in a building is provided with the to-be-located AP, and an identifier of the to-be-located AP is set at a location, corresponding to the any physical location, in the building drawing.

Figure 4:
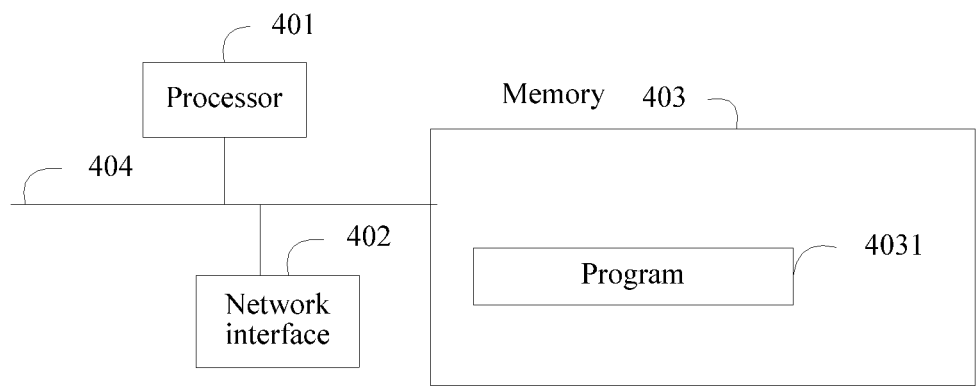
FIG. 4 is a schematic structural diagram of a locating apparatus according to an embodiment of the present invention.

As shown in FIG. 4, embodiments of the present invention further provide a locating apparatus, configured to perform the method for locating a wireless node AP according to the foregoing embodiments. The locating apparatus includes at least one processor 401 (for example, a CPU), at least one network interface 402 or another communications interface, a memory 403, and at least one communications bus 404, configured to implement connection and communication among these apparatuses. The processor 401 is configured to execute an executable module, for example, a computer program, stored in the memory 403. The memory 403 may include a high-speed random access memory (RAM: Random Access Memory), and may further include a non-volatile memory (non-volatile memory), for example, at least one magnetic disk memory. A communication connection between the locating apparatus and at least one other network element is implemented by using the at least one network interface 402 (which may be wired or wireless), where the Internet, a wide area network, a local area network, a metropolitan area network, or the like may be used. The locating apparatus is further provided with a file system. The file system is configured to manage a directory and a file, each directory is corresponding to a directory storage object, the directory storage object includes an attribute list, included in the corresponding directory, of the file or the directory, and the attribute list includes a name and attribute information of the file or the directory.

In some implementations, the locating apparatus locates an AP disposed in a physical area, where M APs are deployed in the physical area, the M APs include N first reference APs and L to-be-located APs, physical locations of the first reference APs and a first distance between any two first reference APs are determinate, N is an integer that is greater than or equal to 3 and less than M, a sum of N and L equals M, and L is an integer. The memory 403 stores a program 4031. The program includes instructions. The processor executes the instructions to perform: obtaining a first electromagnetic wave signal received by a first to-be-located AP of the L to-be-located APs, where the first electromagnetic wave signal includes an electromagnetic wave signal sent by each first reference AP; determining a second distance between the first to-be-located AP and each first reference AP according to the obtained first electromagnetic wave signal; and determining a physical location of the first to-be-located AP according to the first distance, the second distance, and the physical locations of all the first reference APs.

The foregoing one or more technical solutions in the embodiments of this application have at least the following technical effects.

According to the method and the apparatus provided in the embodiments of the present invention, a to-be-located AP whose location is unknown is located by using an electromagnetic wave signal transmitted by a reference AP whose location has been determined, a location relationship between each to-be-located AP and the reference AP is determined by a device according to the location of the reference AP and strength of an electromagnetic wave signal, and a system automatically performs calculation to determine a physical location of each to-be-located AP in a network management topology, so as to facilitate AP management for a network administrator.

In addition, a location of a to-be-located AP is further verified by continuously using an AP that has been located through calculation as a reference AP, so that physical locations of all APs within a specified range and area are conveniently and accurately obtained through calculation.

If multiple APs are disposed on different floors of a multi-floor building, an AP, located through calculation, on a lower floor may also be used as a reference AP of an AP on an upper floor, and an AP on another floor is located by using the reference AP, so that a user does not need to dispose a reference AP on each floor, thereby reducing implementation steps of a locating operation.

The method described in the present invention is not limited to the embodiments described in the Description of Embodiments. Another implementation obtained by a person skilled in the art according to the technical solutions of the present invention still belongs to a technical innovation scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A method, comprising:
obtaining a first electromagnetic wave signal received by a first to-be-located access point (AP) of L to-be-located APs, wherein M APs are deployed in a physical area, the M APs comprise N first reference APs and the L to-be-located APs, physical locations of the N first reference APs and a first distance between any two first reference APs are determinate, N is an integer that is greater than or equal to 3 and less than M, a sum of N and L equals M, and L is an integer, and wherein the first electromagnetic wave signal comprises an electromagnetic wave signal sent by each first reference AP;
determining a second distance between the first to-be-located AP and each first reference AP according to the first electromagnetic wave signal; and determining a physical location of the first to-be-located AP according to the first distance, the second distance, and the physical locations of all the N first reference APs.

2. The method according to claim 1, wherein the L to-be-located APs are disposed on different floors of a building, and a first vertical distance between each of the N first reference APs and ground of a specified floor is less than a first threshold, and wherein determining the physical location of the first to-be-located AP comprises:
  determining a second vertical distance between the first to-be-located AP and the ground of the specified floor according to the first distance and the second distance; and
  determining whether the second vertical distance is not greater than the first threshold;
  and when the second vertical distance is not greater than the first threshold, determining the physical location of the first to-be-located AP using the ground of the specified floor as a reference.

3. The method according to claim 2, wherein the second vertical distance is greater than the first threshold, and determining the physical location of the first to-be-located AP comprises:
  determining, according to the second vertical distance, a target floor on which the first to-be-located AP is located, and determining the physical location of the first to-be-located AP using ground of the target floor as a reference.

4. The method according to claim 3, wherein, after it is determined that at least three to-be-located APs are physically located on the target floor, the method further comprises:
  determining a third distance between any two to-be-located APs of the at least three to-be-located APs according to physical locations of the at least three to-be-located APs, and using the at least three to-be-located APs as second reference APs of the target floor;
  obtaining a second electromagnetic wave signal received by a second to-be-located AP of the L to-be-located APs whose physical location has not been determined, wherein the second electromagnetic wave signal comprises an electromagnetic wave signal sent by each second reference AP;
  determining a fourth distance between the second to-be-located AP and each second reference AP according to the second electromagnetic wave signal; and
  determining the physical location of the second to-be-located AP using a physical location of the second reference AP, the third distance, and the fourth distance.

5. The method according to claim 1, wherein, after the determining a physical location of the first to-be-located AP, the method further comprises:
  obtaining building drawing information of the physical area; and
  adding information about determined physical locations of the M APs to the building drawing information, so that any physical location in a building is provided with the to-be-located AP, and an identifier of the to-be-located AP is set at a location, corresponding to the any physical location, in the building drawing.

6. An apparatus, comprising:
  an obtaining module, configured to obtain a first electromagnetic wave signal received by a first to-be-located access point (AP) of L to-be-located APs, wherein M access points APs are deployed in a physical area, the M APs comprise N first reference APs and the L to-be-located APs, physical locations of the N first reference APs and a first distance between any two first reference APs are determinate, N is an integer that is greater than or equal to 3 and less than M, a sum of N and L equals to M, and L is an integer, and wherein the first electromagnetic wave signal comprises an electromagnetic wave signal sent by each first reference AP;
  a distance calculation module, configured to determine a second distance between the first to-be-located AP and each first reference AP according to the first electromagnetic wave signal; and
  a locating module, configured to determine a physical location of the first to-be-located AP according to the first distance, the second distance, and the physical locations of all the first reference APs.

7. The apparatus according to claim 6, wherein the L to-be-located APs are disposed on different floors of a building, a first vertical distance between each of the N first reference APs and ground of a specified floor is less than a first threshold, and the locating module is further configured to:
  determine a second vertical distance between the first to-be-located AP and the ground of the specified floor according to the first distance and the second distance; and
  determine whether the second vertical is not greater than the first threshold, and when the second vertical is not greater than the first threshold, determine the physical location of the first to-be-located AP by using the ground of the specified floor as a reference.

8. The apparatus according to claim 7, wherein, when the second vertical distance is greater than the first threshold, the locating module is further configured to: determine, according to the second vertical distance, a target floor on which the first to-be-located AP is located, and determine the physical location of the first to-be-located AP using ground of the target floor as a reference.

9. The apparatus according to claim 8, wherein, after it is determined that at least three to-be-located APs are physically located on the target floor, the locating module is further configured to:
  determine a third distance between any two to-be-located APs of the at least three to-be-located APs according to physical locations of the at least three to-be-located APs, and use the at least three to-be-located APs as second reference APs of the target floor;
  obtain a second electromagnetic wave signal received by a second to-be-located AP, whose physical location has not been determined, of the L to-be-located APs, wherein the second electromagnetic wave signal comprises an electromagnetic wave signal sent by each second reference AP;
  determine a fourth distance between the second to-be-located AP and each second reference AP according to the second electromagnetic wave signal; and
  determine the physical location of the second to-be-located AP using a physical location of the second reference AP, the third distance, and the fourth distance.

10. The apparatus according to claim 6, further comprising an information adding module, the information adding module being configured to:
  obtain building drawing information of the physical area; and
  add information about determined physical locations of the M APs to the building drawing information, so that any physical location in a building is provided with the to-be-located AP, and an identifier of the to-be-located AP is set at a location, corresponding to the any physical location, in the building drawing.

11. An apparatus, comprising:
a processor; and
a non-transitory memory storing instructions, the processor being configured to execute the instructions to:
  obtain a first electromagnetic wave signal received by a first to-be-located AP of L to-be-located APs, wherein M APs are deployed in a physical area, the M APs comprise N first reference APs and the L to-be-located APs, physical locations of the N first reference APs and a first distance between any two first reference APs are determinate, N is an integer that is greater than or equal to 3 and less than M, a sum of N and L equals to M, and L is an integer, and wherein the first electromagnetic wave signal comprises an electromagnetic wave signal sent by each first reference AP;
  determine a second distance between the first to-be-located AP and each first reference AP according to the obtained first electromagnetic wave signal; and
  determine a physical location of the first to-be-located AP according to the first distance, the second distance, and the physical locations of all the N first reference APs.

12. The apparatus according to claim 11, wherein the L to-be-located APs are disposed on different floors of a building, and a first vertical distance between each of the N first reference APs and ground of a specified floor is less than a first threshold, and the processor is further configured to execute the instructions to:
  determine a second vertical distance between the first to-be-located AP and the ground of the specified floor according to the first distance and the second distance; and
  determine whether the second vertical distance is not greater than the first threshold; and
  when the second vertical distance is not greater than the first threshold, determine the physical location of the first to-be-located AP using the ground of the specified floor as a reference.

13. The apparatus according to claim 12, wherein, when the second vertical distance is greater than the first threshold, the processor is further configured to execute the instructions to:
  determine, according to the second vertical distance, a target floor on which the first to-be-located AP is located, and determine the physical location of the first to-be-located AP using ground of the target floor as a reference.

14. The apparatus according to claim 13, wherein, after it is determined that at least three to-be-located APs are physically located on the target floor, the processor is further configured to execute the instructions to:
  determine a third distance between any two to-be-located APs of the at least three to-be-located APs according to physical locations of the at least three to-be-located APs, and use the at least three to-be-located APs as second reference APs of the target floor;
  obtain a second electromagnetic wave signal received by a second to-be-located AP of the L to-be-located APs whose physical location has not been determined, wherein the second electromagnetic wave signal comprises an electromagnetic wave signal sent by each second reference AP;
  determine a fourth distance between the second to-be-located AP and each second reference AP according to the second electromagnetic wave signal; and
  determine the physical location of the second to-be-located AP using a physical location of the second reference AP, the third distance, and the fourth distance.

15. The apparatus according to claim ii, wherein after determining the physical location of the first to-be-located AP, the processor is further configured to execute the instructions to: obtain building drawing information of the physical area; and
  add information about determined physical locations of the M APs to the building drawing information, so that any physical location in a building is provided with the to-be-located AP, and an identifier of the to-be-located AP is set at a location, corresponding to the any physical location, in the building drawing.

* * * * *

UNITED STATES PATENT AND TRADEMARK OFFICE
CERTIFICATE OF CORRECTION

PATENT NO. : 10,215,838 B2
APPLICATION NO. : 15/664148
DATED : February 26, 2019
INVENTOR(S) : Shukai Huang et al.

It is certified that error appears in the above-identified patent and that said Letters Patent is hereby corrected as shown below:

In the Claims

In Column 14, Line 30, Claim 15, delete "claim ii" and insert --claim 11--.

Signed and Sealed this
Ninth Day of July, 2019

Andrei Iancu
*Director of the United States Patent and Trademark Office*